W. MAUSS.
ROCK DRILL.
APPLICATION FILED NOV. 6, 1915.
1,303,705.
Patented May 13, 1919.
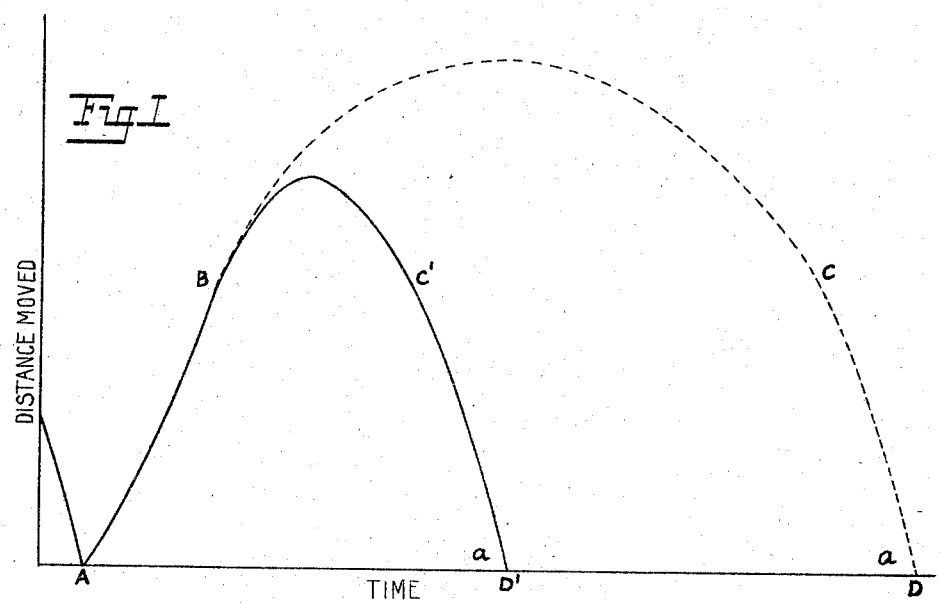
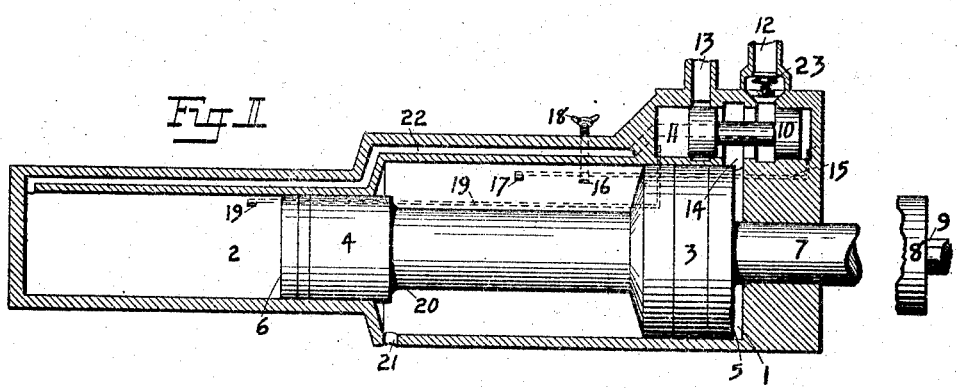
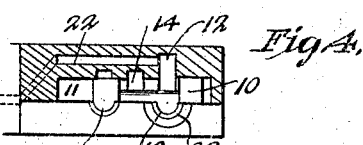
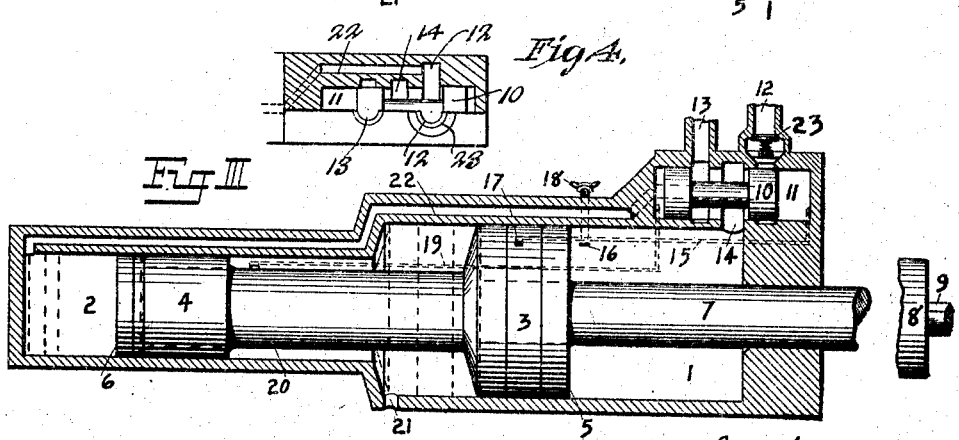

UNITED STATES PATENT OFFICE.

WILHELM MAUSS, OF JOHANNESBURG, TRANSVAAL, SOUTH AFRICA.

ROCK-DRILL.

1,303,705.  Specification of Letters Patent.  Patented May 13, 1919.

Application filed November 6, 1915. Serial No. 59,983.

*To all whom it may concern:*

Be it known that I, WILHELM MAUSS, a British subject, and a resident of Commercial Exchange Buildings, Johannesburg, Transvaal Province, Union of South Africa, have invented certain new and useful Improvements in Rock-Drills, of which the following is a specification.

The present invention relates to fluid actuated rock drills of the type in which the drilling tool is fixed to and reciprocates with the piston. These are distinguished from hammer rock drills and other types of percussive apparatus by the fact that they embody a large moving mass consisting of the piston, piston rod, chuck and tool with which it is necessary for efficient work, to strike a heavy and unrestricted blow direct onto the rock face which is being broken, while the machine must at each stroke pull back the tool against resistance which varies considerably, according to the depth and angle of the hole, the nature of the ground, and the extent to which the drill is true with the hole in which it works.

As the piston is free it must be prevented from striking the rear end of the cylinder and this is usually effected by applying only a small average effective propulsive force during the rearward stroke of the piston. Reversal of the piston is effected by live air in communication with the source of supply, which may be introduced by early admission to the rear cylinder or by keeping a relatively small rear piston face in constant communication with the source of supply.

My investigations have shown that in such drills there is a considerable waste of time in effecting the cycle and consequently the drill does not strike the number of blows per minute which it is capable of. In particular time is lost in stopping and reversing the piston at the end of its rearward stroke. This is reflected in Figure I in which the dotted line is a graph showing the relation between time occupied and distance traversed, during one cycle of a typical drill in general use. The angle of the line to the coördinates is the measure of the velocity of the piston at any instant and the change of angularity, of course, indicates acceleration.

The return stroke is usually started by the rebound of the piston from the rock with a velocity which varies with the force of the blow and the hardness of the rock. The velocity so acquired by the piston is continued and accelerated. This part of the cycle is represented by A—B. Cushioning and restarting of the piston takes place from B—C, and C—D indicates the blow stroke. The latter is the useful part of the cycle, but occupies only about one eighth of the whole period.

The purpose of the invention is to enable a rock drill to strike blows of the desired intensity more rapidly than is possible with the present constructions. To this end the invention seeks to accelerate the piston to the maximum extent throughout the whole of its cycle.

As compared with the method of operation above referred to the present invention is distinguished by maintaining continued pressure on the rear piston face carrying full motive force throughout the initial and greater part of the rearward stroke and during that period imparting a large excess of energy to the piston; then suddenly producing forward acceleration of the piston by removing the rearwardly acting force, taking up the excess energy from the piston by causing it to compress the limited body of the high pressure working fluid behind it and expending such excess in starting the piston at high velocity on its forward stroke. By excess energy is meant energy in excess of that required to effect the rearward stroke against normal resistance.

In the accompanying drawings,

Figure I shows a graph of the times of operation.

Fig. II is a longitudinal section of a rock drill embodying the invention, and Fig. III is a similar view with the parts in a different position.

Fig. IV is a partial sectional plan view on the plane X—X of Fig. II.

The cylinder comprises a large front chamber 1 and a smaller rear chamber 2. The piston correspondingly has a relatively large front member 3 and a smaller rear member 4, providing respectively the forward pressure area 5 and the rear pressure area 6. The piston carries a piston rod 7 and a chuck 8 in which the drill tool 9 is secured.

The distributing valve 10 works in the valve chamber 11. It governs admission to and exhaust from the front cylinder chamber 1 and is arranged closely contiguous thereto. 12 is a large bore inlet port and 13 a similar exhaust port. 14 is a short wide port from the valve chamber to the front cylinder. During its reciprocation the valve alternately connects the cylinder port 14 to one or other of the ports 12 or 13.

The valve 10 is controlled by and substantially synchronously with the piston by any suitable means. As shown a passage 15 is carried from the front end of the valve chamber 11 to the forward piston chamber 1 and opens thereinto by means of two mouths 16 and 17. The forward mouth 16 may be closed by means of a screw-down valve 18.

There is also a passage 19 from the rear end of the valve chamber to the rear cylinder chamber 2. During the rearward movement of the piston, the rear end of the valve chamber is exhausted through the passage 19, the annular recess 20 around the piston, and the hole 21 in the cylinder wall. Air is admitted to the front end of the valve chamber from the front cylinder chamber through the opening 16 if its valve 18 is open or otherwise through the opening 17, and valve 10 is consequently thrown backward as shown in Fig. III. Before the blow is struck the passage 15 is connected to atmosphere by the recess 20 and the hole 21; while pressure fluid passes into the passage 19 and the valve is thrown forward again as in Fig. II.

Air is supplied to the rear cylinder chamber by a large bore port 22 taken from the inlet port 12 near to the valve 10 and entering the cylinder at its extreme end. 23 is a non-return valve positioned in the inlet 12 beyond both the valve 10 and the port 22.

In Fig. II the piston is shown as though it has just struck its blow. Live air is now acting on both piston faces 6 and 5 and the latter being of greater area the piston is forced back. During the first part of such backward movement air displaced from the cylinder chamber 2 assists in feeding the front cylinder chamber 1 rapidly and completely. The piston area 5 is very considerably in excess of the area 6, so that the piston is driven back with very considerable effective force which is continued until the valve 10 is reversed. The aim is to make the forward and return strokes in approximately equal time and to this end area 5 may advantageously be twice the area 6.

When the piston head 3 uncovers the passage mouth 16 to pressure (the screw-down valve 18 being assumed to be open) the valve 10 is reversed and the front cylinder is exhausted thus suddenly removing the backwardly acting pressure from the piston.

The piston has by this time (if working with reasonable freedom) acquired considerable excess rearward momentum. Its continued movement tends to displace more air from the rear cylinder chamber 2; and as this cannot now enter the forward cylinder 1 it tends to pass back into the supply pipe and so promptly closes the non-return valve 23. Continued movement of the piston therefore compresses the air inclosed in the cylinder chamber 2 and the port 22. Said air being initially at the working pressure, a short continued movement of the piston causes the pressure to rise rapidly with the result that the piston is quickly stopped and started again by reëxpansion of the air, the excess energy of the rearward stroke being thus passed on to the forward stroke. The dotted lines of Fig. III indicate the normal rearward limit of the stroke.

Air is lost by leakage during the compression and reëxpansion period; but as soon as the pressure in the chamber 2 falls to that of the inlet air the non-return valve 23 opens and maintains working pressure behind the piston; and as exhaust is maintained in the front cylinder, acceleration of the piston is continued throughout the forward stroke. Just before the blow is struck the valve 10 is again reversed, full pressure is again established in the front cylinder and acts in conjunction with the rebound of the piston from the blow to start the piston backward at considerable velocity.

It will be seen from the foregoing description that the cycle comprises a period of sustained rearward acceleration in continuation of the rebounding movement of the piston, during which the piston acquires considerable excess energy, a rapid change to forward acceleration by compression of an inclosed body of fluid at high initial pressure and exerting unbalanced force on the piston, and continuation of the forward acceleration under at least the full working pressure until the blow is struck. This is shown in the graph A B C' D' of Fig. I.

It will be seen that as compared with A, B, C, D, the section B, C is considerably shortened in its time component and the whole cycle is thus made in a fraction of the period A, D, the velocity of the blow, (indicated by the angle $a$,) however, remaining the same.

Owing to the valve 10 being close up to the front cylinder and to the shortness of the port 14, there is practically no wire drawing of the air and said port 14 can be made of ample area without material loss of air. Air is not consumed in the rear cylinder and the port 22, though long, can consequently be made of ample area to maintain full pressure on the rear face 6.

The position of the hole 16 is so adjusted that, with the machine in its more usual drilling position and about the average resistance to the retraction of the tool, the piston will have acquired considerable excess momentum when its head 3 uncovers said hole 16 to pressure and will therefore travel back some distance before it is stopped and returned. If the resistance is increased the latter area of face 5, exposed as it is to full pressure, insures the rearward movement of the piston until the hole 17 is uncovered, and therefore enough movement to keep the tool cleared; but the piston may reverse at that point and its travel will be correspondingly shortened. To enable the drill to work more effectually against considerable rearward resistance, the hole 16 is closed by its valve 18. The piston therefore continues to move backward under full pressure until it uncovers the hole 17 to pressure and the piston thereby acquires the desired excess momentum. The hole 16 may also conveniently be closed or opened as the live air pressure is low or high.

Since all the energy imparted to the piston during a complete cycle (except that lost by friction) is accumulated in the piston on the forward stroke, the force of the blow and the period of the cycle is practically constant whatever the position in which the drill is working. When drilling an uphole the weight of the piston, etc., causes heavy compression which correspondingly assists the forward stroke; while when drilling vertically downward the weight directly assists the forward stroke and the compression is correspondingly less.

I claim:

1. The process of operating a fluid driven reciprocating tool rock drill which consists in applying continued fluid pressure to the rear working face of the piston, applying fluid pressure in considerable excess to drive the piston rearwardly, withdrawing such rearward pressure during the rearward stroke and maintaining such withdrawal until the blow is struck, and causing the piston to compress, the fluid acting on its rear working piston area while said fluid is cut off from the source of supply, whereby the piston is stopped and restarted on its forward stroke and excess energy imparted to the piston during the rearward stroke is returned to it on the forward stroke.

2. The process of operating a fluid driven reciprocating tool rock drill, which consists in applying continued fluid pressure to the rear working face of the piston and thereby striking a blow, immediately applying fluid pressure in considerable excess to drive the piston rearward in continuation of the rebounding movement of the piston from the blow without diminution, continuing the application of said rearwardly acting pressure fluid without diminution until the piston has acquired momentum considerably in excess of that required to make the rearward stroke, withdrawing such rearward acting pressure during the rearward stroke and maintaining such withdrawal until the blow is struck, and causing the piston to compress the fluid acting on its rear working piston area while said fluid is cut off from the source of supply, whereby the piston is stopped and restarted on its forward stroke and excess energy imparted to the piston during the rearward stroke is returned to it on the forward stroke.

3. In a rock drill, the combination of a cylinder, a differential piston provided with means for securing a tool to it, said piston having a front pressure area considerably larger than its rear pressure area, fluid inlet means for the rear cylinder chamber including a port leading from the air inlet of the engine to the rear cylinder chamber, said inlet means being governed by the rearward movement of the piston to cut off communication between the inlet and the rear cylinder chamber, and a valve controlling admission to and exhaust from the front cylinder chamber.

4. In a rock drill, the combination with a cylinder and piston of means for securing a tool to the piston, a valve controlling admission to and exhaust from the front cylinder chamber, and positioned closely adjacent to said chamber, and means for maintaining continuous fluid pressure on the rear working piston area, said means causing fluid to be inclosed for compression in the rear cylinder chamber during the rearward stroke of the piston.

5. In a rock drill, the combination with the cylinder and piston of means for securing a tool to the piston, means controlling the inlet of fluid to the front cylinder said means being adjustable to vary the period of inlet and means responsive to the cessation of feeding the front cylinder for producing compression in the rear cylinder chamber.

6. In a rock drill, the combination with the cylinder and piston of means for securing a tool to the piston, means for maintaining continued fluid pressure on the rear working face of the piston, said means allowing fluid to be inclosed for compression in the rear cylinder chamber during the rearward stroke of the piston, means to prevent the pressure in the rear cylinder chamber from falling below the normal working pressure therein, and a valve controlling admission to and exhaust from the front cylinder chamber.

7. In a rock drill channeling machine, or coal cutter, the combination with the cylinder and piston, of means controlling the period of inlet to the front cylinder chamber and means responsive to the cessation of feeding the front cylinder for producing compression in the rear cylinder chamber.

In testimony whereof I affix my signature.

WILHELM MAUSS.

Copies of this patent may be obtained for five cents each, by addressing the "Commissioner of Patents Washington, D. C."